US012630286B1

(12) United States Patent　　　　　(10) Patent No.:　US 12,630,286 B1

Rocher et al.　　　　　　　　　　　　(45) Date of Patent:　May 19, 2026

(54) AIRCRAFT HAVING A PIVOTING LANDING GEAR PROVIDED WITH A PIVOT LOCKING SYSTEM AND A MONITORING SYSTEM

(71) Applicant: AIRBUS HELICOPTERS, Marignane Cedex (FR)

(72) Inventors: Antonin Rocher, Ensues-la-Redonne (FR); Roland Becquet, Meyreuil (FR); Julien Azzarello, Marseilles (FR); Aurélien Achard, Vitrolles (FR)

(73) Assignee: AIRBUS HELICOPTERS, Marignane Cedex (FR)

(*) Notice: Subject to any disclaimer, the term of this patent is extended or adjusted under 35 U.S.C. 154(b) by 0 days.

(21) Appl. No.: 19/241,814

(22) Filed: Jun. 18, 2025

(30) Foreign Application Priority Data

Nov. 18, 2024　(FR) ....................................... 2412543

(51) Int. Cl.
B64C 25/50　　　　(2006.01)

(52) U.S. Cl.
CPC ................................... B64C 25/50 (2013.01)

(58) Field of Classification Search
CPC ........ B64C 25/50; B64C 25/505; B64U 70/60
See application file for complete search history.

(56) References Cited

U.S. PATENT DOCUMENTS 1,896,234 A * 2/1933 Hathorn .................. B64C 25/50
　　　　　　　　　　　　　　　　　　　　244/109
2,211,484 A 8/1940 Raymond

| | | | |
|---|---|---|---|
| 2,502,522 A | 4/1950 | Hoobler | |
| 3,006,579 A * | 10/1961 | Frederick ................ | B64C 25/50 244/50 |
| 3,375,999 A * | 4/1968 | Labrecque .............. | B64C 25/50 244/50 |
| 5,333,816 A * | 8/1994 | Del Monte ............. | B64C 25/50 244/50 |
| 8,833,693 B2 * | 9/2014 | Lafitte ...................... | F16D 7/10 244/50 |
| 11,794,884 B1 | 10/2023 | Hinman et al. | |
| 2018/0372535 A1 | 12/2018 | Bailly et al. | |

FOREIGN PATENT DOCUMENTS

| CN | 104210654 A | 12/2014 |
|---|---|---|
| EP | 0662906 B1 | 3/1997 |

OTHER PUBLICATIONS

French Search Report for French Application No. FR2412543, Completed by the French Patent Office, Dated Apr. 2, 2025, 11 pages.

* cited by examiner

*Primary Examiner* — Brian M O'Hara

(74) *Attorney, Agent, or Firm* — BROOKS KUSHMAN P.C.

(57)　　　　　　　ABSTRACT

An aircraft having a landing gear provided with a stand and a pivoting assembly, the landing gear having a pivot locking system comprising a movable locking finger and a passage provided in a base. A monitoring system is configured to determine the presence of a risk of sudden yaw movement of the aircraft in the event of a take-off or an unlocking of the landing gear when the locking finger is in the locked mode on the ground, the monitoring system being configured to emit a risk signal to a processing system following a determination of the presence of the risk of sudden yaw movement.

10 Claims, 4 Drawing Sheets

AIRCRAFT HAVING A PIVOTING LANDING GEAR PROVIDED WITH A PIVOT LOCKING SYSTEM AND A MONITORING SYSTEM

CROSS REFERENCE TO RELATED APPLICATION

This application claims priority to French patent application No. FR 24 12543 filed on Nov. 18, 2024, the disclosure of which is incorporated in its entirety by reference herein.

TECHNICAL FIELD

The present disclosure relates to an aircraft having a pivoting landing gear provided with a pivot locking system and a monitoring system.

BACKGROUND

A landing gear of an aircraft, for example a rotorcraft or a helicopter, may comprise at least one pivoting landing gear. Such a pivoting landing gear may comprise an assembly carrying at least one ground contact member and able to pivot through 360 degrees about a pivot axis in order to facilitate the movement of the aircraft on the ground. The term "ground" refers hereinafter to any surface on which an aircraft can land, such as the surface of the Earth, the roof of a building, the deck of a ship, etc.

For example, a tricycle-gear rotorcraft may comprise two main landing gears and one auxiliary landing gear, each comprising at least one wheel. The two main landing gears are not able to pivot. However, the auxiliary landing gear is able to pivot in order to ensure the maneuverability of the aircraft on the ground. When on the ground, the wheel or wheels of the auxiliary landing gear are free to pivot about a pivot axis that is separate from the axis or axes of rotation of the wheels. On a helicopter provided with a yaw angle control system and, for example, a rear rotor, turning can be undertaken on the ground by controlling the thrust exerted by this yaw angle control system. The yaw angle control system generates a moment on an airframe of the aircraft carried by the landing gears, and this moment automatically pivots the auxiliary landing gear to orientate the aircraft in the required direction.

However, such a pivoting landing gear is conventionally provided with a pivot locking system. On command, the pivot locking system locks the pivoting landing gear in a predetermined position that causes the aircraft to move in a straight line. The wheel or wheels of the pivoting landing gear are then substantially in the longitudinal axis of the aircraft.

A known pivot locking system comprises a locking finger that can enter a bore of a base secured to the pivoting assembly of a pivoting landing gear. In addition, the pivot locking system comprises an elastic connecting rod connected to the locking finger, and connected to a handle, in particular by a ball control. In order to place the pivot locking system in an unlocked mode, the handle is operated by an operator to position the locking finger outside of the bore. As a result, the pivoting assembly is free to pivot about a pivot axis. In order to lock the pivoting landing gear, the handle is operated by an operator to position the locking finger in the bore.

Such a pivot locking system is effective. However, when the pivoting landing gear is locked, the pilot may mistakenly apply excessive yaw control. The aircraft then remains stable on the ground due to the forces at the contacts between the wheel(s) and the ground. Nevertheless, if the crew unlocks the pivoting landing gear, this equilibrium is interrupted, which can lead to a sudden yaw movement of the aircraft. Similarly, if the aircraft takes off under these conditions, this balance is also interrupted and, without a prompt reaction from the pilot, the aircraft starts to rotate along the yaw axis.

Documents U.S. Pat. No. 3,375,999, EP 662906 B1, CN104210654 A, EP 0 662 906 B1, U.S. Pat. Nos. 2,502, 522 A, 2,211,484 A, 11,794,884 B1, and US 2018/372535 A1 are known.

SUMMARY

An object of the present disclosure is thus to propose a landing gear having an innovative landing gear in order to limit the risks of a sudden destabilization.

Thus, the disclosure relates to an aircraft provided with a pivoting landing gear provided with a stand and with a pivoting assembly carrying a contact member that is configured to be in contact with the ground, said pivoting assembly being able to move in rotation about a pivot axis relative to the stand, said pivoting landing gear having a pivot locking system comprising a movable locking finger and a passage provided in a base, the locking finger being outside said passage in an unlocked mode in order to leave the pivoting assembly free to pivot relative to the stand, the locking finger being placed in a locked mode in said passage in order to restrict said pivoting, the locking finger being carried by the stand and the base belonging to the pivoting assembly.

The aircraft comprises a monitoring system configured to determine the presence of a risk of sudden yaw movement of the aircraft in the event of a take-off or an unlocking of the pivoting landing gear when the locking finger is in the locked mode on the ground, the monitoring system being configured to emit a risk signal, to a processing system, following a determination of the presence of said risk of sudden yaw movement.

The term "signal" refers hereinafter, for example, to an analog, digital, electrical or optical signal, carrying data.

Thus, when the pivot locking system is in the locked mode, the monitoring system makes it possible to determine whether the aircraft presents a risk of destabilization in the event of unlocking of the pivoting landing gear or in the event of take-off, and as a result controls a system of the aircraft to limit the risks of having such a destabilization. The pilot may optionally act on the aircraft's flight controls to reduce the yaw moment exerted on the aircraft. As a result, the pilot maneuver allows the aircraft to no longer present a risk of sudden yaw movement. The pilot may choose to unlock the landing gear and/or take-off safely.

Thus, the monitoring system may make it possible to limit the risks of destabilization of the aircraft related to a piloting error in the presence of a locked pivoting landing gear.

The landing gear may also comprise one or more of the following features, taken individually or in combination.

According to one possibility, the processing system may comprise an alarm generator generating an alarm following reception of the risk signal.

The alarm generator can warn a crew of the presence of a risk of sudden yaw movement.

According to one possibility compatible with the preceding possibilities, the processing system may comprise an inhibitor holding the locking finger in the locked mode following reception of the risk signal.

The inhibitor is then automatically activated to immobilize the locking finger in the locked mode. Thus, a pilot cannot accidentally unlock the pivoting landing gear while a risk of destabilization is present. On the other hand, a pilot can reduce the yaw moment exerted on the aircraft. When the pilot maneuver enables the aircraft to no longer present the risk of sudden yaw movement, the risk signal is no longer emitted and the inhibitor is deactivated. The pilot can then safely unlock the pivoting landing gear.

Optionally, said inhibitor may comprise an immobilization actuator holding the locking finger in the locked mode either by shape interference with the locking finger or with a control controlling a movement of the locking finger, or by inhibiting such a control.

According to one alternative, the locking finger may be made movable by an electric actuator. The inhibitor may then comprise a member inhibiting this electric actuator, either by means of electronic logic implemented in the electric actuator or by cutting off a power supply to this electric actuator, for example.

According to one alternative, the locking finger may be made movable by a mechanical system. In this case, a dedicated actuator may be used to brake or immobilize the locking finger or this mechanical system.

According to one possibility compatible with the preceding possibilities, the monitoring system may be configured to determine said presence of said risk of sudden yaw movement when a value relating to a force in the locking system is greater than a limit.

Indeed, if the aircraft is subjected to a significant yaw moment capable of generating a risk of sudden yaw movement, then the locking system is subjected to a significant force. A shearing force exerted by the base on the locking finger or a force exerted by the locking finger on a bearing guiding it, for example, then tends to increase until it exceeds a limit. This limit may be established by following analysis trials, tests and/or simulations. For example, the limit may be determined from the angular acceleration that the aircraft would experience in the event of take-off or unlocking of the landing gear. The limit may also be established on the basis of dedicated trials aimed at estimating the ability of a pilot to avoid a loss of stability in the event of sudden yaw rotation of the aircraft and in the presence of various load levels of the locking finger. The limit can also be evaluated on the basis of a yaw command to be applied to counterbalance the effects of the loss of stability.

If the monitoring system determines that a value varying in conjunction with such a force exerted by or on the locking finger is greater than the limit, the monitoring system deduces that the aircraft presents a risk of destabilization, and as a result controls the processing system.

According to one possibility compatible with the preceding possibilities, the monitoring system may comprise at least one sensor for measuring said value and a controller, the sensor emitting, to the controller, a measurement signal carrying said value, said controller being configured to determine whether the value is above the limit and to generate said risk signal as a result.

Therefore, the monitoring system comprises at least one sensor and a controller comparing the measured value with the limit, in order to determine whether the risk signal should be emitted. A crew is thus informed of the presence of a risk of destabilization if the pivoting landing gear is unlocked or if the aircraft takes off.

Optionally, a preventive alert is issued if said value is between a predetermined threshold and said limit.

According to one possibility, said sensor may comprise at least one strain gauge arranged on the locking finger and measuring said value, said force being a shear force exerted on the locking finger, more precisely by the base.

Said value relating to said force may be determined in a conventional manner using one or more strain gauges.

According to another possibility, the sensor may comprise an instrumented bearing, guiding said locking finger and measuring said value, said force being a force exerted by said locking finger on the instrumented bearing.

In this case, the bearing may comprise at least one strain gauge for conventionally measuring the value relative to the force exerted by the locking finger on the instrumented bearing, this force being in fact an image of the yaw moment exerted on the aircraft.

According to another possibility, said monitoring system may comprise at least two alarm microswitches disposed on either side of the monitoring finger, for example in a plane perpendicular to the pivot axis, an alarm microswitch being activated when said value is greater than the limit in the presence of a pivoting of the pivoting assembly relative to the stand in one direction, each activated alarm microswitch emitting an alarm signal, the alarm signal representing the risk signal transmitted to the processing system or being transmitted to a controller which as a result emits the risk signal.

The monitoring system may have two alarm microswitches in order to take into consideration the possible pivoting of the pivoting assembly in two opposite directions.

Optionally, the system may comprise two alert microswitches to generate a preventive alert before the alarm signal is issued.

According to another possibility, said monitoring system may comprise a position sensor measuring a current position of a yaw control of the aircraft and a speed sensor measuring a current rotation speed of a lift rotor of the aircraft, said monitoring system comprising a controller in communication with the position sensor and the speed sensor, the controller being configured to emit the risk signal as a function of at least said current position and the current rotation speed.

Indeed, on a rotorcraft and for example a helicopter, the risk of loss of control of the aircraft during the unlocking on the ground of the pivoting landing gear or during take-off can be identified based at least on the position of the yaw control, taken for example at a rudder bar, as well as on the rotation speed of the lift rotor. The current position of the yaw control can be measured in the usual way, and expressed, for example, as a deflection angle. Likewise, the current rotation speed may be measured in the usual way, and expressed, for example, as a percentage of a nominal rotation speed.

For example, said controller may be configured to estimate a current yaw moment as a function of said current position and of the current rotation speed, or as a function of said current position and the current rotation speed as well as a position of a member for controlling the collective pitch of blades of said lift rotor, measured using a complementary sensor, and to generate said risk signal if the current yaw moment is greater than a limit moment.

For example, the controller stores a law giving the current yaw moment as a function of said current position and the current rotation speed, and possibly also of the position of the member for controlling the collective pitch of blades of said lift rotor. Such a member may take the form, for example, of a conventional collective pitch lever. Here and hereinafter, the term "law" means a mathematical law, a table of values, a neural network or the like. The law may be established by trials, calculations and/or simulations, for example.

In another example, said controller is configured to determine a current yaw moment solely as a function of said current position or as a function of said current position and a position of a member for controlling the collective pitch of blades of said lift rotor, measured using a complementary sensor, the controller being configured to generate said risk signal if the current yaw moment is greater than a limit moment and if, in conjunction, the current rotation speed is greater than a predetermined speed threshold.

In this simplified variant, the controller takes into account the position of the yaw control, or even the position of the member for controlling the collective pitch of blades of said lift rotor, in order to evaluate the current yaw moment, but is activated only from a rotation speed threshold of the rotor.

According to one possibility compatible with the preceding possibilities, said aircraft may comprise an auxiliary landing gear and two main landing gears, said pivoting landing gear forming said auxiliary landing gear.

The disclosure also relates to a method of monitoring an aircraft comprising a pivoting landing gear provided with a stand and with a pivoting assembly carrying a contact member that is configured to be in contact with the ground, said pivoting assembly being able to move in rotation about a pivot axis relative to the stand, said pivoting landing gear having a pivot locking system comprising a movable locking finger and a passage provided in a base, the locking finger being outside said passage in an unlocked mode in order to leave the pivoting assembly free to pivot relative to the stand, the locking finger being placed in a locked mode in said passage in order to restrict said pivoting, the locking finger being carried by the stand and the base belonging to the pivoting assembly. This method comprises, in particular:

determining, using a monitoring system, the presence of a risk of a sudden yaw movement of the aircraft in the event of a take-off or an unlocking of the pivoting landing gear when the locking finger is in the locked mode on the ground; and following determining, using the monitoring system, of the presence of said risk of sudden yaw movement of the aircraft, transmitting a risk signal to a processing system.

The method may also comprise the steps described above.

BRIEF DESCRIPTION OF THE DRAWINGS

The disclosure and its advantages appear in greater detail from the following description of examples given by way of illustration with reference to the accompanying figures, wherein.

DETAILED DESCRIPTION

Elements present in more than one of the figures are given the same references in each of them.

Figure 1:
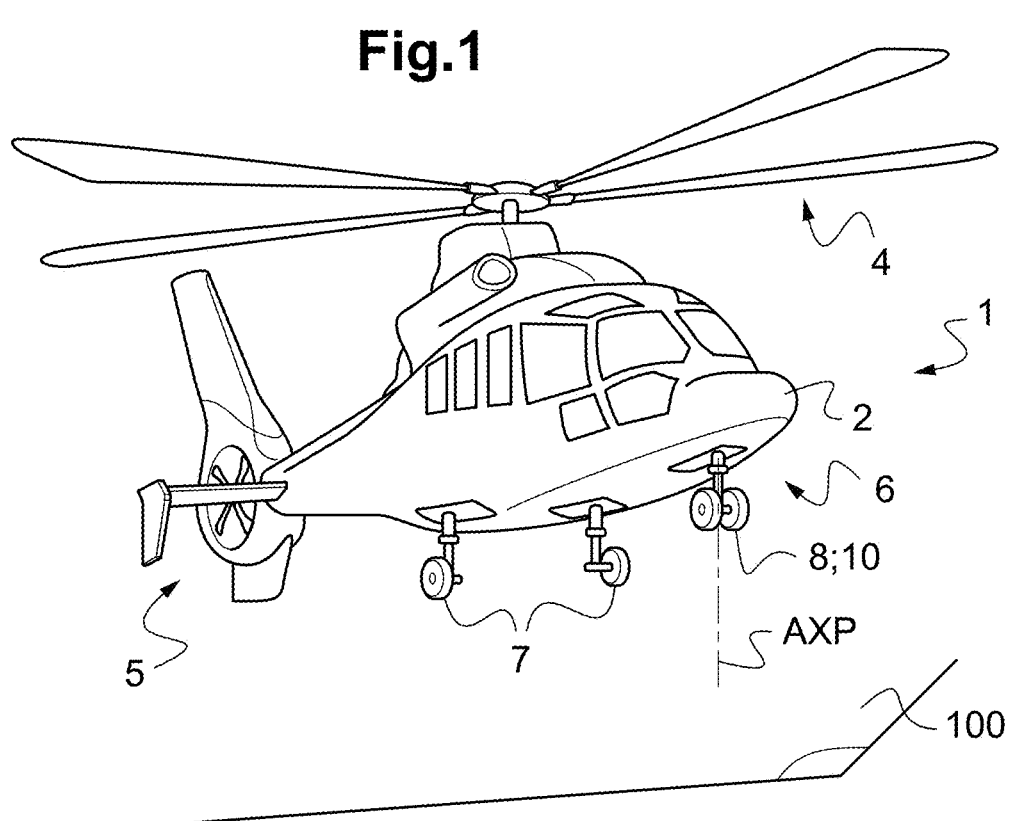
FIG. 1 is a diagram showing a rotorcraft according to the disclosure.

FIG. 1 shows an aircraft 1 according to the disclosure. This aircraft 1 comprises an airframe 2 optionally carrying at least one lift rotor 4, namely a rotor participating at least in the lift of the aircraft 1 or also in its propulsion. In this case, the aircraft 1 illustrated is a helicopter having a lift rotor 4 and a yaw control system that may comprise a tail rotor 5. Other yaw control systems are possible, such as, for example, the system known under the brand name NOTAR. The collective pitch of the blades of the lift rotor 4 can be controlled by a control member 91 illustrated in FIG. 9. The thrust generated by the yaw control system can be controlled by a yaw control 97 illustrated in FIG. 9, such as a rudder bar, for example. In addition, the airframe 2 rests on a landing gear system 6 comprising, for example, at least one landing gear, i.e., two main landing gears 7 and an auxiliary landing gear 8 in this example. Independently of the nature of the aircraft 1, this aircraft 1 comprises, in particular, at least one pivoting landing gear 10, namely the auxiliary landing gear 8 according to the example.

Figure 2:
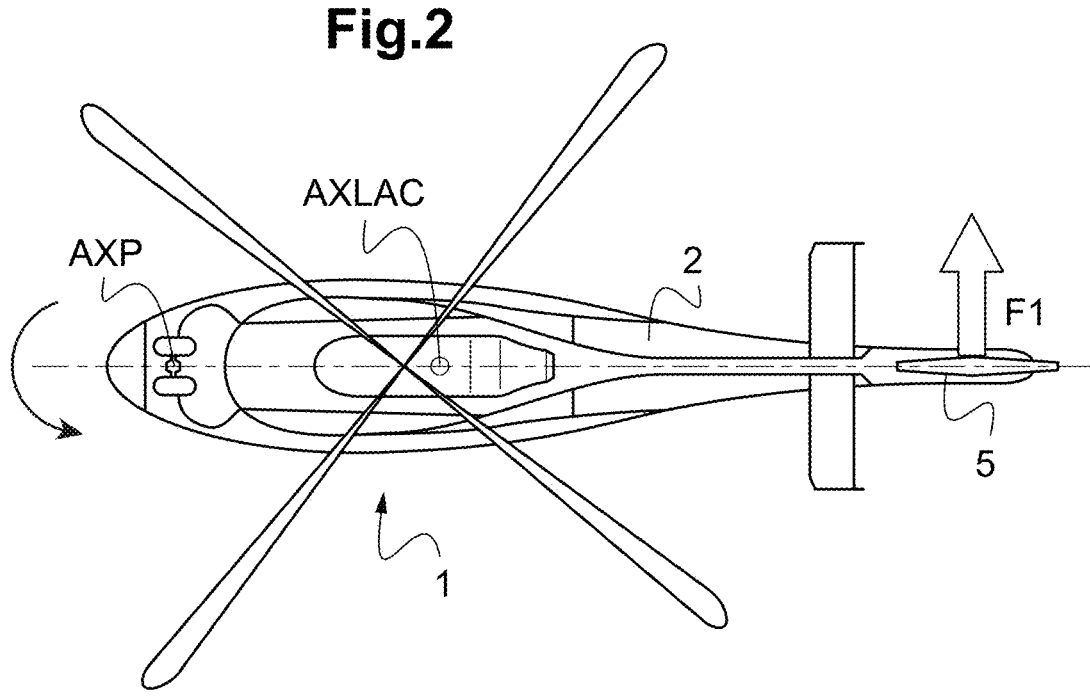
FIG. 2 is a diagram showing a top view of the rotorcraft of FIG. 1.

With reference to FIG. 2, when the yaw control system exerts lateral thrust F1, the pivoting landing gear 10 rotates on the ground about a pivot axis AXP in order to modify the orientation of the rotorcraft 1. The landing gear 10 therefore comprises a pivot locking system to keep the pivoting landing gear 10 substantially aligned along the axis of forward movement of the rotorcraft 1, under certain conditions.

Figure 3:
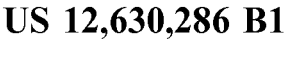
FIG. 3 is a diagram detailing an example of a pivoting landing gear according to the disclosure and having a locking system, in the locked mode.

FIG. 3 shows an exemplary embodiment of a pivoting landing gear 10 according to the disclosure. Irrespective of the embodiment, the landing gear 10 is provided with a stand 11, connected to the airframe 2, and a pivoting assembly 12 that can pivot about a pivot axis AXP relative to the stand 11. The pivoting assembly 12 carries at least one contact member 15 that is configured to be in contact with the ground 100. For example, a contact member 15 comprises a wheel 150 that is able to move in rotation about a pivot axis AXROT relative to the pivoting assembly 12.

By way of illustration, FIG. 3 shows an example of a stand 11 and a pivoting assembly 12, but other embodiments of the stand 11 and the pivoting assembly 12 are possible. In particular, the stand 11 may be fixed or retractable without going beyond the ambit of the disclosure. According to the example shown, the pivoting assembly 12 may comprise a cylinder 13 that is able to move in rotation about the pivot axis AXP relative to the stand 11. Moreover, the pivoting assembly 12 comprises a shock absorber 14 carried by the cylinder 13 and housed at least partially in this cylinder 13. In addition, a scissors 16 is hinged to the cylinder 13 and to the shock absorber 14. At least one contact member 15 may be carried by the scissors 16 or the shock absorber 14, for example.

Irrespective of the manner in which the pivoting assembly 12 and the stand 11 are embodied, the landing gear 10 comprises a pivot locking system 20 configured: i) to immobilize the pivoting assembly 12 relative to the stand 11 during a locked mode MODV, apart from the operating clearances, and ii) to allow, without limitation, pivoting of the pivoting assembly 12 about the pivot axis AXP relative to the stand 11 during an unlocked mode MODDV.

The pivot locking system 20 comprises a locking finger 25 that can move relative to a passage 22 provided in a base 21 to request an application of the locked mode MODV. The locking finger 25 is carried by the stand 11 and the base 21 belongs to the pivoting assembly 12. For example, the base 21 forms a one-piece component with the cylinder 13 according to FIG. 3. The locking finger 25 is then outside of the passage 22 in the unlocked mode MODDV in order to leave the pivoting assembly 12 free to pivot relative to the stand 11. On the other hand, the locking finger 25 is placed in a locked mode MODV in the passage 22 to restrict said pivoting. In another aspect, the locking finger 25 may comprise a fusible area 270 for safety.

In order to control the movement of the locking finger 25, the locking system 20 may comprise a control 30. The control 30 may comprise a human-machine interface 31 that can be operated by an operator in order to control a movement system. This displacement system may comprise at least one cable that can move in translation or, for example, a ball control 33, at least one setting wheel 34, an elastic connecting rod 35, an actuator 37, or the like.

In FIG. 3, the movement system comprises a cable 33 connected to a handle 31, sliding in a sheath 32 and connected by a lever 36 to an elastic connecting rod 35 connected to the locking finger 25.

Alternatively and according to the examples illustrated in FIGS. 4 to 8, the movement system comprises a human-machine interface 31 in wired or wireless communication with an electric actuator 37 capable of translationally or rotationally moving the locking finger 25.

Irrespective of the manner of moving the locking finger 25 and with reference to FIG. 3, the aircraft 1 comprises a monitoring system 50 and a processing system 60. The monitoring system 50 is configured to determine the presence of a risk of sudden yaw movement of the aircraft 1 in the event of a take-off or an unlocking of the pivoting landing gear 10 when the locking finger 25 is in the locked mode MODV on the ground, and to emit a risk signal, to the processing system 60, following the determination of the presence of a risk of sudden yaw movement.

Thus, the method according to the disclosure comprises the following steps:

determining, during a step STP2 and using the monitoring system 50, the presence of a risk of sudden yaw movement of the aircraft 1 in the event of a take-off or an unlocking of the pivoting landing gear 10 when the locking finger 25 is in the locked mode MODV; and and if present, transmitting, during a step STP3 and using the monitoring system 50, a risk signal to a processing system 60.

The processing system 60 may comprise an alarm generator 61 linked by a wired or wireless link to the monitoring system 50. The function of the alarm generator 61 is, in particular, to generate an alarm following the reception of the risk signal. Each alarm may be in the form of a visual alarm, for example emitting a light using a light-emitting diode or an equivalent, or one or more characters being displayed on a screen, an audible alarm, via a loudspeaker, and/or a haptic alarm, for example by means of a vibrating unit causing a member held or worn by an individual to vibrate.

In a complementary or alternative manner, the processing system 60 may comprise an inhibitor 70 linked by a wired or wireless link to the monitoring system 50. The function of the inhibitor 70 is to block the locking finger 25, on request, in the locked mode MODV. For example, the inhibitor 70 comprises an immobilization actuator 71 capable of holding the locking finger 25, on command, in the locked mode MODV. In the presence of a mechanical movement system in particular, such an immobilization actuator 71 may, for example, brake or block by shape interference the locking finger 25 or a member of the control 30 moving this locking finger 25. In the presence of a locking finger 25 controlled by a locking actuator, the immobilization actuator 71 may inhibit this locking actuator, for example by having a relay electrically cut off a power supply line as part of an electrical locking actuator, or by closing a valve supplying a hydraulic locking actuator.

According to another aspect, the aircraft 1 may comprise an alert generator 62 in wired or wireless communication with the monitoring system 50. The monitoring system 50 is then configured to generate and transmit an alert signal to the alert generator 62, before the risk signal is emitted. The alert generator 62 then emits an alert as a result. Each alert may be in the form of a visual alert, for example emitting a light using a light-emitting diode or an equivalent, or one or more characters being displayed on a screen, an audible alert, via a loudspeaker, and/or a haptic alert, for example by means of a vibrating unit causing a member held or worn by an individual to vibrate. The alert generator 62 and the alarm generator 31 may form a single piece of equipment, possibly capable of performing other functions.

In order to generate the risk signal, or even the alert signal, according to FIGS. 3 to 8, the monitoring system 50 is configured to evaluate, during a step STP1, a value relating to a force in the locking system 20 relative to a limit. Thus, the monitoring system 50 is configured to determine said presence of said risk of sudden yaw movement when said value is greater than a limit, and optionally to generate an alert if this value is between a threshold and this limit.

Thus, according to the examples of FIGS. 3 to 7, the monitoring system 50 may comprise at least one sensor 40 for measuring said value and a controller 55. The sensor 40 emits, to the controller 55, a measurement signal carrying said value, the controller 55 determining whether the value is greater than the limit and generating said risk signal as a result, or even to determine whether the value is between the threshold and this limit and then generate the alert signal.

The term "sensor" should be understood to mean a physical sensor capable of directly measuring the parameter in question, but also a system that may comprise one or more physical sensors, as well as means for processing the signal that make it possible to provide an estimation of the parameter based on the measurements provided by these physical sensors. Similarly, the notion of measuring parameters refers to both a raw measurement from a physical sensor and a measurement obtained by relatively complex processing of raw measurement signals.

In addition, the controller 55 comprises a processing unit. In the description, the term "processing unit" refers to a component that may comprise, for example, at least one processor and at least one memory, at least one integrated circuit, at least one programmable system, and at least one logic circuit, these examples not limiting the scope to be given to the term "processing unit". The term "processor" may refer equally to a central processing unit or CPU, a graphics processing unit or GPU, a digital signal processor or DSP, a microcontroller, etc.

Thus, according to the example of FIG. 3, the monitoring system 50 may comprise a sensor 40 provided with at least one strain gauge 41 arranged on the locking finger 25. In the illustrated case, the locking finger 25 is inserted into the passage 22 along an axis AXT substantially parallel to the pivot axis AXP. Therefore, a strain gauge 41 may be placed on one or more of the sides of the locking finger 25. Each strain gauge 41 then communicates with the controller 55 that is configured to emit, to the processing system 60, a risk signal indicating a risk of loss of stability when the measured value VM measured using the sensor 40 exceeds a stored limit LIM.

Regardless of the nature of the sensor, FIG. 3 illustrates the possibility of having an inhibitor 70 provided with an electric or other: immobilizing actuator 71 moving an immobilizing finger 73 capable of blocking the locking finger 25 by shape interference in the locked position. For example, the immobilizing finger 73 is in contact with a shoulder of the locking finger 25 when the inhibitor 70 is active, in order to prevent removal of the locking finger 25 from the passage 22.

Figures 4, 5, 6:
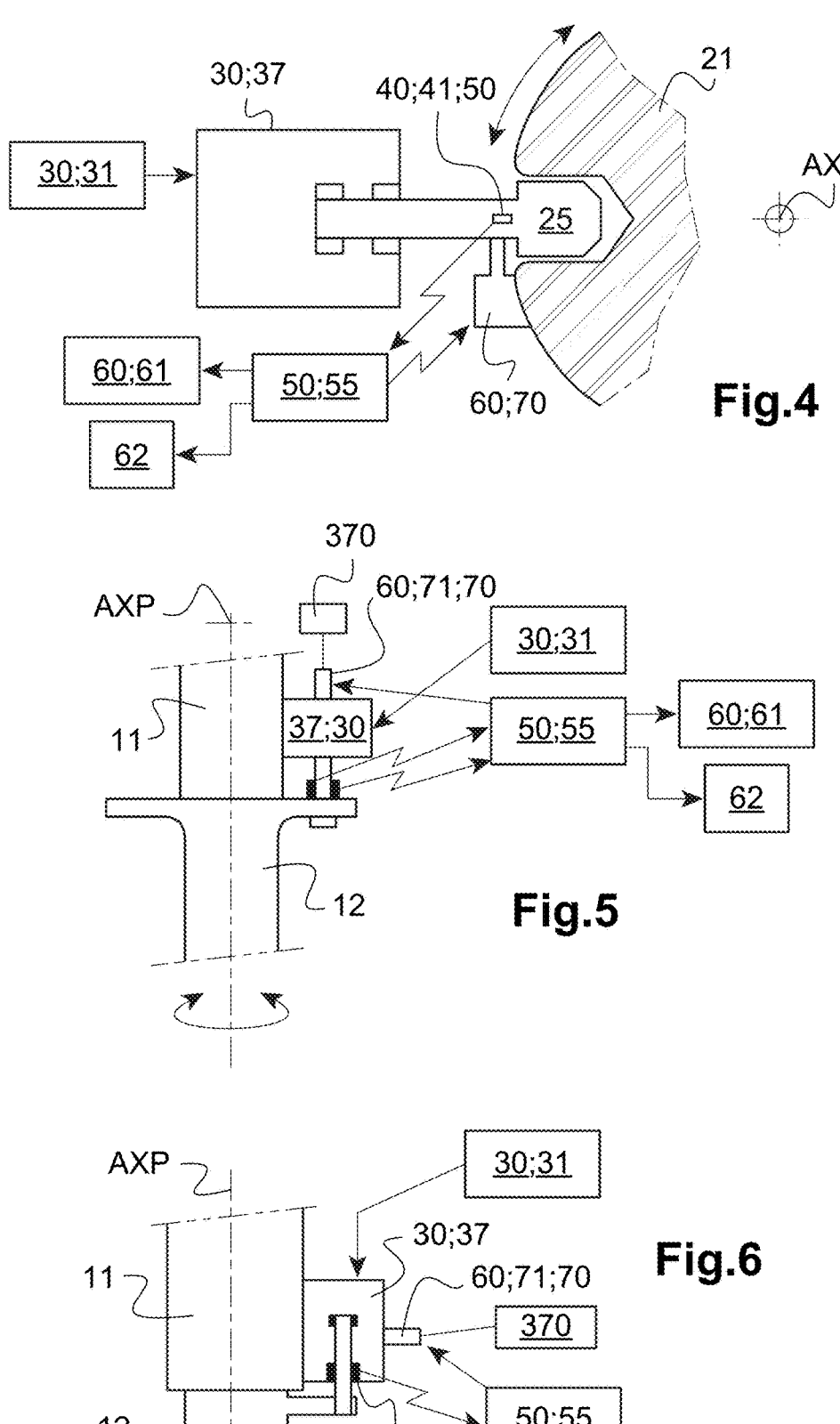
FIG. 4 is a diagram showing an example of a monitoring system according to the disclosure.
FIG. 5 is a diagram showing an example of a monitoring system according to the disclosure.
FIG. 6 is a diagram showing an example of a monitoring system according to the disclosure.

FIG. 4 illustrates a sensor 40 and an inhibitor 70 of the same type as in FIG. 3. On the other hand, FIG. 4 illustrates the possibility of introducing the locking finger 25 radially into the passage 22, with regard to the pivot axis AXP, contrary to FIG. 3. In this case, the strain gauge 41 may be placed on the top or bottom of the locking finger 25 in order to measure an image value of the shear force taken up by the locking finger 25. FIG. 4 also illustrates a control 30 provided with an interface 31 controlling an electric actuator 37 to move the locking finger 25.

According to the example of FIG. 5, an inhibitor 70 is provided with an immobilization actuator 71 inhibiting an electric actuator 37 for locking the control 30. According to the example shown, the immobilization actuator 71 electrically isolates the electrical actuator 37 from the electrical power source 370 that electrically powers it.

According to the example of FIG. 6, the sensor 40 may comprise an instrumented bearing 42 guiding the locking finger 25, the instrumented bearing 42 comprising at least one strain gauge 41 measuring an image value of the force exerted by the locking finger 25 on this instrumented bearing 42. Regardless of the nature of the sensor, FIG. 6 illustrates the possibility of having an inhibitor 70 provided with an immobilization actuator 71 inhibiting an electrical actuator 37 of the control.

Figure 7:
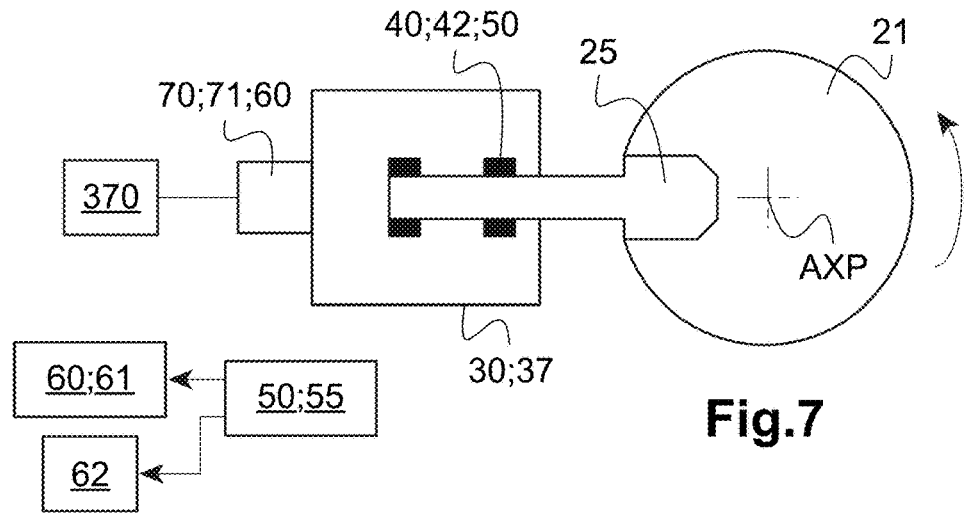
FIG. 7 is a diagram showing an example of a monitoring system according to the disclosure.

FIG. 7 illustrates an equivalent variant provided with a locking finger 25 that is radially inserted into the passage of the support 21, relative to the pivot axis AXP, contrary to FIG. 6.

Figure 8:
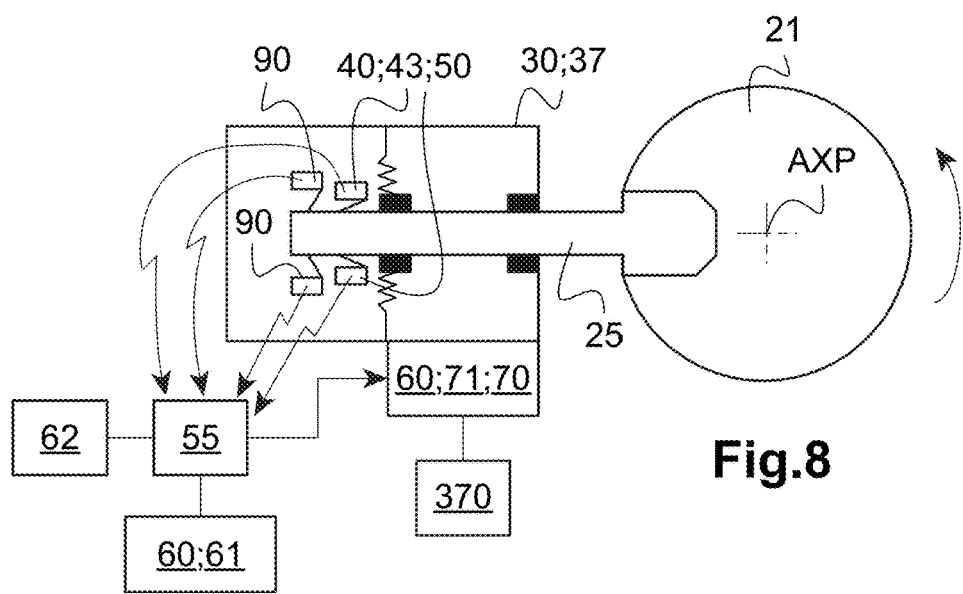
FIG. 8 is a diagram detailing an example of a monitoring system according to the disclosure.

According to the example in FIG. 8, the sensor 40 may comprise two alarm microswitches 43 disposed on either side of the locking finger 25, and in a plane perpendicular to the pivot axis AXP in the example shown. Optionally, the locking system 50 may also comprise two alert microswitches 90 disposed on either side of the locking finger 25 to generate an alert. The alarm microswitches 43 may communicate with a controller 55 that controls the processing system 60, or may transmit signals directly to the processing system 60. Similarly, the alert microswitches 90 can communicate with the controller 55, or transmit signals directly to the alert generator 62.

Figure 9:
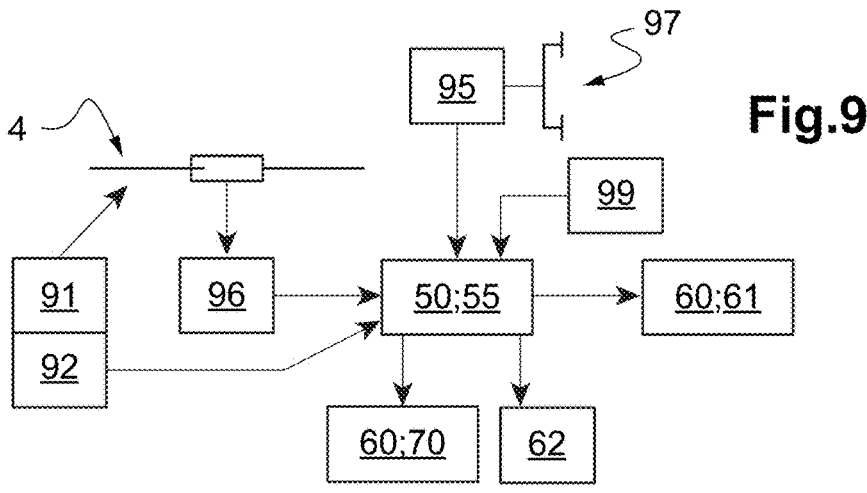
FIG. 9 is a diagram detailing an example of a monitoring system according to the disclosure.

According to another alternative described in FIG. 9, the monitoring system 50 comprises a position sensor 95 measuring a current position of a yaw control 97 of the aircraft 1 and a speed sensor 96 measuring a current rotation speed of a lift rotor 4 of the aircraft 1, or even a complementary sensor 92 measuring a current position of a member 91 for controlling the collective pitch of blades of said lift rotor 4. The monitoring system 50 may comprise a detection sensor 99 for evaluating whether the aircraft is on the ground, for example by evaluating a pressure in the landing gear 10 or a position of the landing gear. The monitoring system 50 comprises a controller 55 in communication with the position sensor 95 and the speed sensor 96, or even the detection sensor 99 and the complementary sensor 92. The controller 55 is then configured to emit the risk signal as a function of said current position and the current rotation speed, or even of the signal emitted by the detection sensor 99 and/or the position of the control member 91, in order to emit the risk signal when the aircraft 1 is on the ground.

According to a variant, the controller 55 determines, using a stored law for example, a current yaw moment as a function of said current position of the yaw control 97 and of the current rotation speed, or even of the position of the control member 91. The controller 55 then generates the risk signal if the current yaw moment is greater than a stored limit moment, or if in conjunction the detection sensor 99 emits a measurement indicating that the aircraft is on the ground.

According to a variant, the controller 55 determines, using a law that is stored for example, a current yaw moment solely as a function of the current position of the yaw control 97 or as a function of the current position of the yaw control 97 and the position of the control member 91. The controller 55 is then configured to emit the risk signal if the current yaw moment is greater than a limit moment and if, in conjunction, the current rotation speed is greater than a predetermined speed threshold, or if, in conjunction, the detection sensor 99 emits a measurement indicating that the aircraft is on the ground.

Naturally, the present disclosure may be subjected to numerous variations as to its implementation. Although several embodiments are described above, it should readily be understood that it is not conceivable to identify exhaustively all the possible embodiments. It is of course possible to replace any of the means described with equivalent means without going beyond the ambit of the present disclosure.

For example, it is possible to mix the various embodiments mentioned above, possibly by using the sensor described in one figure with the inhibitor and/or control described in another figure, and/or by modifying the position of the support and of the locking finger.

What is claimed is:

1. An aircraft provided with a pivoting landing gear provided with a stand and with a pivoting assembly carrying a contact member that is configured to be in contact with the ground, the pivoting assembly being able to move in rotation about a pivot axis relative to the stand, the pivoting landing gear having a pivot locking system comprising a movable locking finger and a passage provided in a base, the locking finger being outside the passage in an unlocked mode in order to leave the pivoting assembly free to pivot relative to the stand, the locking finger being placed in a locked mode in the passage in order to restrict the pivoting, the locking finger being carried by the stand and the base belonging to the pivoting assembly, wherein the aircraft comprises a monitoring system configured to determine the presence of a risk of sudden yaw movement of the aircraft in the event of a take-off or an unlocking of the pivoting landing gear when the locking finger is in the locked mode on the ground, the monitoring system being configured to emit, to a processing system, a risk signal following a determination of the presence of the risk of sudden yaw movement, the monitoring system being configured to determine the presence of the risk of sudden yaw movement when a value relating to a force in the locking system is greater than a limit, the monitoring system comprises at least one sensor for measuring the value and a controller, the sensor emitting, to the controller, a measurement signal carrying the value, the controller being configured to determine whether the value is greater than the limit and to generate the risk signal as a result.

2. The aircraft according to claim 1, wherein the sensor comprises at least one strain gauge arranged on the locking finger and measuring the value, the force being a shear force exerted on the locking finger.

3. The aircraft according to claim 1, wherein the sensor comprises an instrumented bearing guiding the locking finger and measuring the value, the force being a force exerted by the locking finger on the instrumented bearing.

4. The aircraft according to claim 1, wherein the monitoring system further comprises at least two alarm microswitches disposed on either side of the locking finger, one alarm microswitch being activated when the value is greater than the limit in the presence of pivoting of the pivoting assembly relative to the stand in one direction, each activated alarm microswitch emitting an alarm signal, the alarm signal representing the risk signal transmitted to the processing system or being transmitted to a controller which, as a result, emits the risk signal.

5. The aircraft according to claim 1, wherein the monitoring system further comprises a position sensor measuring a current position of a yaw control of the aircraft and a speed sensor measuring a current rotation speed of a lift rotor of the aircraft, the monitoring system including a controller in communication with the position sensor and the speed sensor, the controller being configured to emit the risk signal as a function at least of the current position and of the current rotation speed, the controller is configured to estimate a current yaw moment as a function of the current position and the current rotation speed or as a function of the current position and the current rotation speed as well as a position of a member for controlling the collective pitch of blades of the lift rotor, measured using a complementary sensor, and to generate the risk signal if the current yaw moment is greater than a limit moment.

6. The aircraft according to claim 1, wherein the monitoring system further comprises a position sensor measuring a current position of a yaw control of the aircraft and a speed sensor measuring a current rotation speed of a lift rotor of the aircraft, the monitoring system including a controller in communication with the position sensor and the speed sensor, the controller being configured to emit the risk signal as a function at least of the current position and of the current rotation speed, the controller is configured to determine a current yaw moment solely as a function of the current position or as a function of the current position and a position of a member for controlling the collective pitch of blades of the lift rotor, measured using a complementary sensor, the controller being configured to generate the risk signal if the current yaw moment is greater than a limit moment and if, in conjunction, the current rotation speed is greater than a predetermined speed threshold.

7. The aircraft according to claim 1, wherein the aircraft comprises an auxiliary landing gear and two main landing gears, the pivoting landing gear forming the auxiliary landing gear.

8. The aircraft according to claim 1, wherein the processing system comprises an alarm generator generating an alarm following reception of the risk signal.

9. The aircraft according to claim 1, wherein the processing system comprises an inhibitor holding the locking finger in the locked mode following reception of the risk signal.

10. The aircraft according to claim 9, wherein the inhibitor comprises an immobilization actuator holding the locking finger in the locked mode either by shape interference with the locking finger or with a control controlling a movement of the locking finger, or by inhibiting such a control.

\* \* \* \* \*